(12) United States Patent
Shoulders et al.

(10) Patent No.: US 8,285,413 B1
(45) Date of Patent: Oct. 9, 2012

(54) SHEET METAL FABRICATION SYSTEM

(75) Inventors: James R. Shoulders, Mineral, VA (US); Michael A. Keane, Oak Lawn, IL (US)

(73) Assignee: International Training Institute for the Sheet Metal and Air Conditioning Industry, Alexandria, VA (US)

( * ) Notice: Subject to any disclaimer, the term of this patent is extended or adjusted under 35 U.S.C. 154(b) by 0 days.

(21) Appl. No.: 13/542,950

(22) Filed: Jul. 6, 2012

Related U.S. Application Data

(63) Continuation-in-part of application No. 12/413,570, filed on Mar. 29, 2009, now abandoned.

(51) Int. Cl.
G06F 19/00 (2011.01)
G05B 19/418 (2006.01)
B23P 11/00 (2006.01)

(52) U.S. Cl. ............. 700/145; 700/248; 29/430; 29/431

(58) Field of Classification Search .................. 700/145, 700/248; 29/430, 431
See application file for complete search history.

(56) References Cited

U.S. PATENT DOCUMENTS

| | | | |
|---|---|---|---|
| 4,998,206 A * | 3/1991 | Jones et al. | 700/96 |
| 5,086,262 A * | 2/1992 | Hariki et al. | 318/568.1 |
| 5,988,855 A * | 11/1999 | Marobin | 700/145 |
| 6,237,210 B1 * | 5/2001 | Stoewer et al. | 29/430 |
| 6,658,316 B1 * | 12/2003 | Mehta et al. | 700/182 |
| 7,139,642 B2 * | 11/2006 | Kamoto et al. | 700/248 |
| 7,143,514 B2 * | 12/2006 | Kamada et al. | 29/897.2 |
| 7,330,777 B2 * | 2/2008 | Hashimoto et al. | 700/247 |
| 8,155,778 B1 * | 4/2012 | Barcock | 700/172 |
| 2008/0065348 A1 * | 3/2008 | Dowd | 702/155 |
| 2008/0072644 A1 * | 3/2008 | Umeno et al. | 72/131 |

* cited by examiner

Primary Examiner — Mohammad Ali
Assistant Examiner — Sivalingam Sivanesan
(74) Attorney, Agent, or Firm — Michael S. Neustel

(57) ABSTRACT

A sheet metal fabrication system for efficiently providing robotics to fabricate different types of sheet metal. The sheet metal fabrication system generally includes uploading a fabrication file to a controller, feeding a section of sheet metal to at least one robotic device, fabricating the section of sheet metal according to the fabrication file and forming a finished sheet metal product with the at least one robotic device.

20 Claims, 7 Drawing Sheets

SHEET METAL FABRICATION SYSTEM

CROSS REFERENCE TO RELATED APPLICATIONS

I hereby claim benefit under Title 35, United States Code, Section 120 of U.S. patent application Ser. No. 12/413,570 filed Mar. 29, 2009. This application is a continuation-in-part of the 12/413,570 application. The Ser. No. 12/413,570 application is currently pending. The Ser. No. 12/413,570 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to metal fabrication and more specifically it relates to a sheet metal fabrication system for efficiently providing robotics to fabricate different types of sheet metal.

2. Description of the Related Art

Any discussion of the related art throughout the specification should in no way be considered as an admission that such related art is widely known or forms part of common general knowledge in the field.

Robotic devices have been in use for years in various types of industries, such as automobile industries, assembly plants, electrical manufacture and various others. The use of robotics has drastically changed these industries by making them more precise, cost affordable, and time efficient.

However, the art of fabricating sheet metal, such as ductwork, has not been affected by the robotic industry and for that reason, the necessary cutting, bending, and forming of sheet metal is done manually. This can lead to not as precisely formed sheet metal products, more costly manufacture, and overall less efficient of a process of fabricating sheet metal, than would otherwise be provided by robotic fabrication of sheet metal. Because of the inherent problems with the related art, there is a need for a new and improved sheet metal fabrication system for efficiently providing robotics to fabricate different types of sheet metal.

BRIEF SUMMARY OF THE INVENTION

The general purpose of the present invention is to provide a sheet metal fabrication system that has many of the advantages of the metal fabrication systems mentioned heretofore. The invention generally relates to a metal fabrication system which includes a fabrication file to a controller, feeding a section of sheet metal to at least one robotic device, fabricating the section of sheet metal according to the fabrication file and forming a finished sheet metal product with the at least one robotic device.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a sheet metal fabrication system for efficiently providing robotics to fabricate different types of sheet metal.

Another object is to provide a sheet metal fabrication system that may be applied to a wide variety of types of sheet metal, such as but not limited to ductwork for a heating and ventilation system for a building.

An additional object is to provide a sheet metal fabrication system that includes multiple robotic sequences for various fabrication sequences, such as cutting, shaping, or joining sheet metal.

A further object is to provide a sheet metal fabrication system that increases the overall efficiency in fabricating sheet metal, as well as producing a more precise product.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
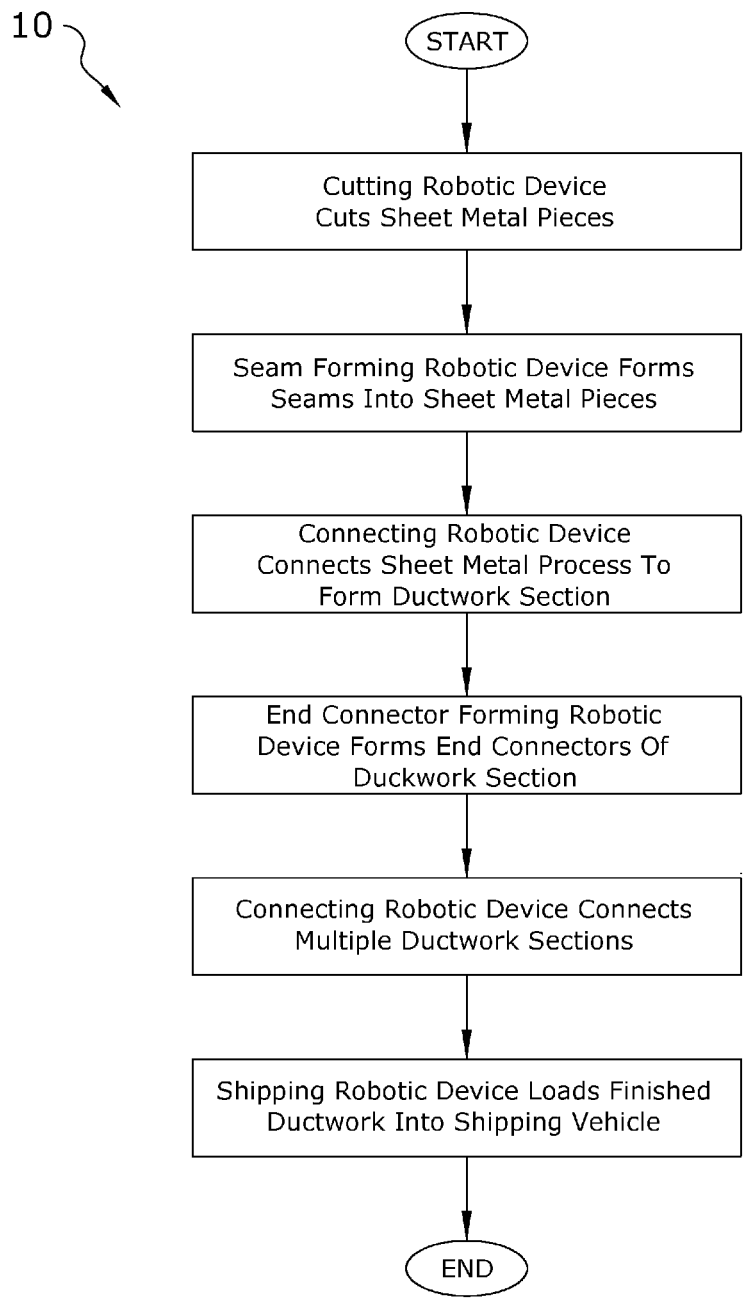
FIG. 1 is a flowchart illustrating the process of using the present invention.
Figure 2:
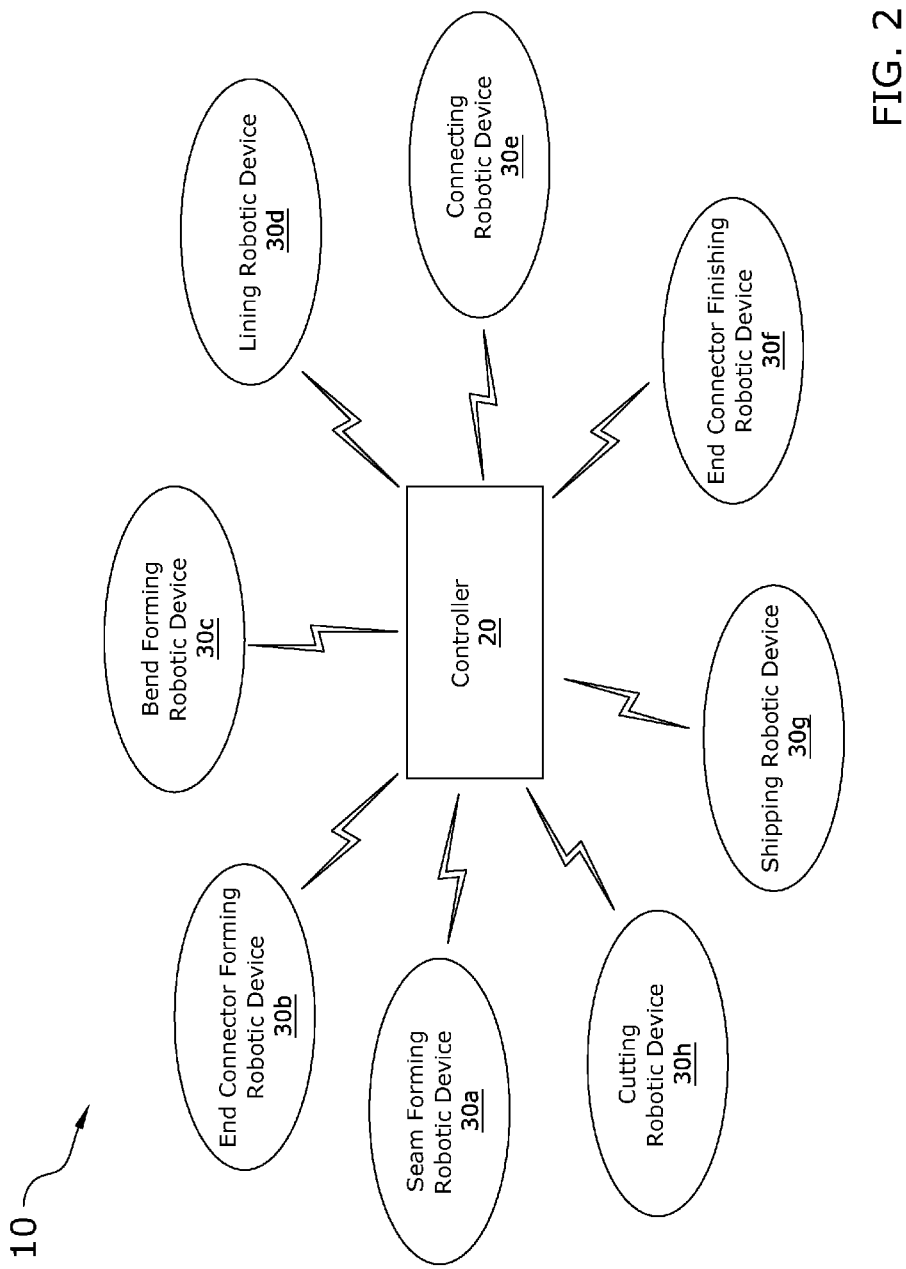
FIG. 2 is an exemplary illustration of the possible connectivity between the robotic devices and the controller.
Figure 3:
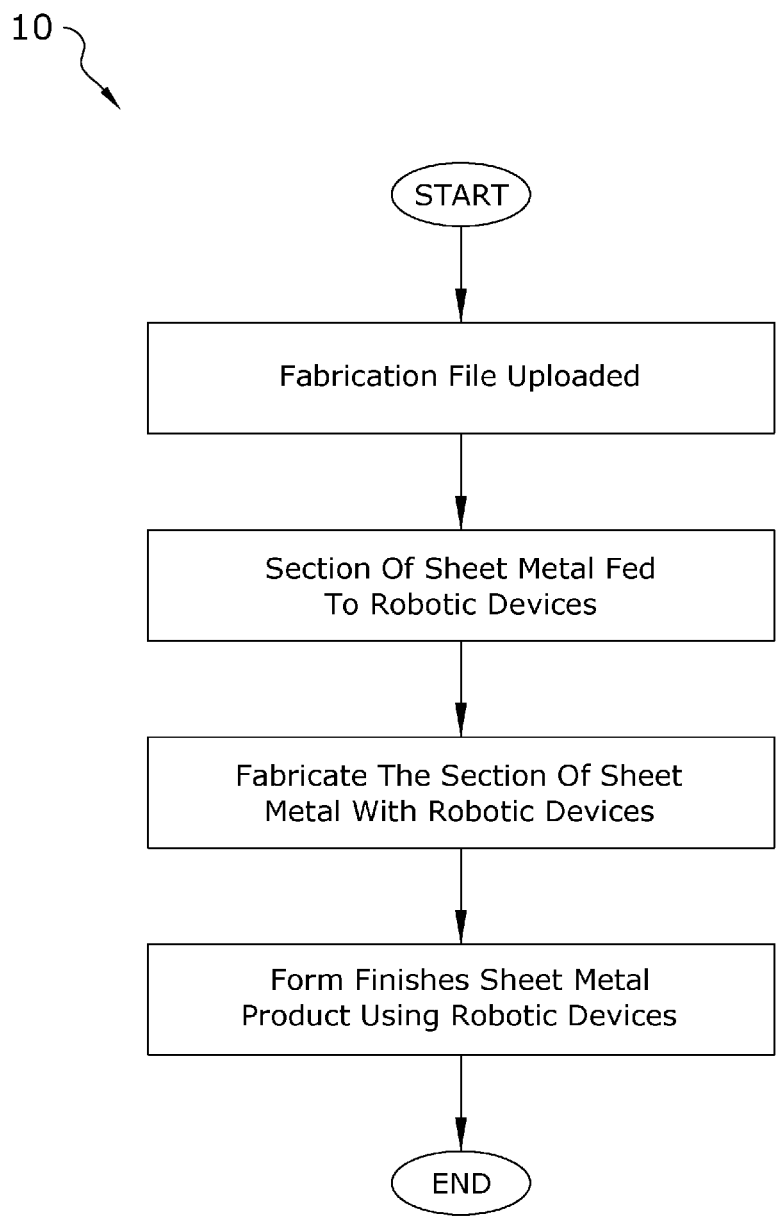
FIG. 3 is an exemplary flowchart of fabricating sheet metal into multiple ductwork sections.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, USB flash drives, magnetic tape, CDs (compact discs), DVDs (digital video discs), and computer instruction signals embodied in a transmission medium (with or without a carrier wave upon which the signals are modulated). For example, the transmission medium may include a communications network, such as the Internet.

The present invention may be embodied within various languages and technologies such as but not limited to JAVA, JAVASCRIPT, JSCRIPT, WMLSCRIPT, ACTIVEX, CGI, scripts, plug-ins, BASIC, VISUAL BASIC, C, C++, COBOL, FORTRAN, ADA, HTML, DHTML, XML, SGML, WML, HDML, FLASH, SHOCKWAVE, GIF, JPEG, ADOBE ACROBAT, PDF, MICROSOFT WORD, and PASCAL. The present invention may be operated upon various operating systems such as but not limited to ANDROID, UNIX, MACINTOSH, LINUX, WINDOWS, PALMOS, EPOC, WINDOWS CE, FLEXOS, OS/9, and JAVAOS.

The present invention may be utilized upon any telecommunication network capable of transmitting data including voice data and other types of electronic data. Examples of suitable telecommunication networks for the present invention include but are not limited to global computer networks (e.g. Internet), wireless networks, cellular networks, satellite communications networks, cable communication networks (via a cable modem), microwave communications network, local area networks (LAN), wide area networks (WAN), campus area networks (CAN), metropolitan-area networks (MAN), and home area networks (HAN). The present invention may communicate via a single telecommunication network or multiple telecommunication networks concurrently. Various protocols may be utilized by the electronic devices for communications such as but not limited to HTTP, SMTP, FTP and WAP (wireless Application Protocol). The present invention may be implemented upon various wireless networks such as but not limited to 3G, 4G, LTE, CDPD, CDMA, GSM, PDC, PHS, TDMA, FLEX, REFLEX, IDEN, TETRA, DECT, DATATAC, and MOBITEX. The present invention may also be utilized with online services and internet service providers.

A. Overview

Turning now descriptively to the drawings, in which similar reference characters denote similar elements throughout the several views, FIGS. 1 through 7 illustrate a sheet metal fabrication system 10, which comprises a fabrication file to a controller 20, feeding a section of sheet metal to at least one robotic device 30a, 30b, 30c, 30d, 30e, 30f, 30g, 30h fabricating the section of sheet metal according to the fabrication file and forming a finished sheet metal product with the at least one robotic device 30a, 30b, 30c, 30d, 30e, 30f, 30g, 30h.

The section of sheet metal may be comprised of an individual cut piece of sheet metal, a coil of sheet metal or various other configurations of sheet metal. The sheet metal product is preferably comprised of rectangular ductwork for a heating, ventilation and air conditioning (HVAC) system within a building, however other objects, structures, and configurations may be formed as desired. Finishing the sheet metal product may refer to finishing the final product (i.e. ready for installation), or simply finishing a stage or certain process in the production of the product. Fabricating refers to any process needed to transform a piece of sheet metal to a finished product. Thus fabricating may include, but is not limited to cutting, forming, bending, shaping, connecting, finishing, polishing, painting, measuring, lining, gluing, adhering and loading a finished product for shipping.

B. Controller

The controller 20 is preferably used as a computer or controlling device to connect the robotic devices in a simultaneously and independently operating manner. The controller 20 may be present at the burn table or may be located in various other locations to communicate with the robotic devices via direct or wireless signals. The controller 20 may dynamically communicate with the robotic devices in various manners, such as but not limited to that illustrated in FIG. 2.

The controller 20 may be comprised of any type of computer for practicing the various aspects of the present invention. For example, the controller 20 can be a personal computer (e.g. APPLE® based computer, an IBM based computer, or compatible thereof) or tablet computer (e.g. IPAD®). The controller 20 may also be comprised of various other electronic devices capable of sending and receiving electronic data including but not limited to smartphones, mobile phones, telephones, personal digital assistants (PDAs), mobile electronic devices, handheld wireless devices, two-way radios, smart phones, communicators, video viewing units, television units, television receivers, cable television receivers, pagers, communication devices, and digital satellite receiver units.

The controller 20 may comprised of any conventional computer. A conventional computer preferably includes a display screen (or monitor), a printer, a hard disk drive, a network interface, and a keyboard. A conventional computer also includes a microprocessor, a memory bus, random access memory (RAM), read only memory (ROM), a peripheral bus, and a keyboard controller. The microprocessor is a general-purpose digital processor that controls the operation of the computer. The microprocessor can be a single-chip processor or implemented with multiple components. Using instructions retrieved from memory, the microprocessor controls the reception and manipulations of input data and the output and display of data on output devices. The memory bus is utilized by the microprocessor to access the RAM and the ROM. RAM is used by microprocessor as a general storage area and as scratch-pad memory, and can also be used to store input data and processed data. ROM can be used to store instructions or program code followed by microprocessor as well as other data. A peripheral bus is used to access the input, output and storage devices used by the computer. In the described embodiments, these devices include a display screen, a printer device, a hard disk drive, and a network interface. A keyboard controller is used to receive input from the keyboard and send decoded symbols for each pressed key to microprocessor over bus. The keyboard is used by a user to input commands and other instructions to the computer system. Other types of user input devices can also be used in conjunction with the present invention. For example, pointing devices such as a computer mouse, a track ball, a stylus, or a tablet to manipulate a pointer on a screen of the computer system. The display screen is an output device that displays images of data provided by the microprocessor via the peripheral bus or provided by other components in the computer. The printer device when operating as a printer provides an image on a sheet of paper or a similar surface. The hard disk drive can be utilized to store various types of data. The microprocessor together with an operating system operate to execute computer code and produce and use data. The computer code and data may reside on RAM, ROM, or hard disk drive. The computer code and data can also reside on a removable program medium and loaded or installed onto computer system when needed. Removable program mediums include, for example, CD-ROM, PC-CARD, USB drives, floppy disk and magnetic tape. The network interface circuit is utilized to send and receive data over a network connected to other computer systems. An interface card or similar device and appropriate software implemented by microprocessor can be utilized to connect the computer system to an existing network and transfer data according to standard protocols.

The controller 20 is able to read the electronic fabrication file, which includes instructions on how to fabricate the sheet metal section or pieces into the finished product by cutting the sheet metal per a nested pattern determined by the CAD program and/or the controller 20. The controller 20 then directs each robotic device to perform the needed operation upon the sheet metal (e.g. cutting, forming seams, forming end connectors, bending, forming end connectors, etc.) and directs the robotic device to transfer the sheet metal piece onto the next robotic device when finished. The controller 20 may further be a separate device or may be integrated within each robotic device, wherein multiple controllers 20 will be utilized.

C. Robotic Devices

The robotic device is used for fabricating different types of sheet metal, such as but not limited to sheet metal used for forming ductwork or other products. The robotic device is capable of performing a variety of commands and functions necessary for the fabrication of the sheet metal. Further, multiple robotic devices may be used to perform multiple different tasks, such as one robotic device used for creating seams, one for connecting sheet metal, one for forming bends, one for lining the sheet metal, one for finishing, and one for loading a delivery vehicle, all of which are used for a task involved in the sheet metal fabrication. The sheet metal is delivered to the robotic devices in various forms, such as in coils, sheets or various others. The multiple robotic devices may further work in sequence, simultaneously, or in various manners to fabricate the sheet metal. The sheet metal may further be patterned in various manners as desired. Examples of robotic devices are as follows.

A cutting robotic device 30h is programmed and structurally configured to cut out one or more metal sheets for a part to be fabricated per the fabrication instructions contained on the fabrication file. It is preferable that the cutting robotic device 30h cut a plurality of "nested" metal sheets from a single sheet of sheet metal in an efficient manner to maximize the usage of the sheet metal delivered to the robotic devices.

A seam forming robotic device 30a may be programmed and structurally configured to form seams upon the sheet metal. The seams may be of various styles and configurations suitable to the particular application. The seams may be formed on individual sides of the ductwork sheet metal.

An end connector forming robotic device 30b is preferably programmed and structurally configured to form connectors in the sheet metal to connect pieces of sheet metal, or the sheet metal to other objects. The end connector forming robotic device 30b further preferably forms connectors upon the ends of the sheet metal or formed ductwork that are used to connect to other three-dimensional ductwork structures.

A bend forming robotic device 30c is preferably programmed and structurally configured to form bends within the sheet metal. The bends are generally formed within flat sheets of sheet metal to form multiple sides of the ductwork or other sheet metal structures.

A lining robotic device 30d is preferably for a lining process of the sheet metal. The lining robotic device 30d may perform various lining steps such as applying glue, internal lining, and spot welding pins.

A connecting robotic device 30e may be used for joining different patterns of sheet metal via welding, joining at the seams or in various other manners. The connecting robotic device 30e may further be used to connect different pieces of sheet metal via the seams that are formed from the first robotic device.

An end connector finishing robotic device 30f may be used for providing a connector finishing. The end connector finishing robotic device 30f may add connector corners if necessary or a new type of connector upon the sheet metal.

A shipping robotic device 30g may be used to load the finished sheet metal products or parts onto a shipping vehicle.

It is appreciated that the robotic devices may be comprised of robotic arms or other robotic assembly type configurations. The robotic devices may be separate from each other or integral with each other, wherein one or more robotic devices may perform one or more different processes. The robotic devices may further be controlled through various computers or automated programs as represented by the controller 20 and necessary to produce a precise and finished sheet metal product.

The robotic devices may be positioned in various manners within a fabrication area, such as along a perimeter of a circle around a burn table. In this configuration, the burn table is at the center of the robotic devices. The burn table is comprised of a common burn table used in the fabrication of parts. In this configuration, a coil of sheet metal is continuously fed from one end of the burn table. Scrap pieces of the sheet metal may be rolled under the burn table and terminated in a metal recycling container. The first, second, and third robotic devices may be organized in a semi-circular configuration around a second end of the burn table opposite the sheet metal feed. The fourth and fifth robotic devices would be outside of the arc formed by the first, second, and third robotic devices.

D. Operation of Preferred Embodiment.

In use, the robotic devices 30a, 30b, 30c, 30d, 30e, 30f, 30g, 30h may operate in various sequences all of which start with a generally unfinished roll or piece of sheet metal and end with a completely finished or at least partly finished (i.e. a certain stage of fabrication is finished) sheet metal product, such as a section or multiple sections of ductwork. In example methods of using the robotic devices 30a, 30b, 30c, 30d, 30e, 30f, 30g, 30h, the coil of sheet metal is fed onto the burn table where it generally undergoes fabrication by the robotic devices 30a, 30b, 30c, 30d, 30e, 30f, 30g, 30h, where the sheet metal may then be directed to a different robotic device for further fabrication.

Figure 4:
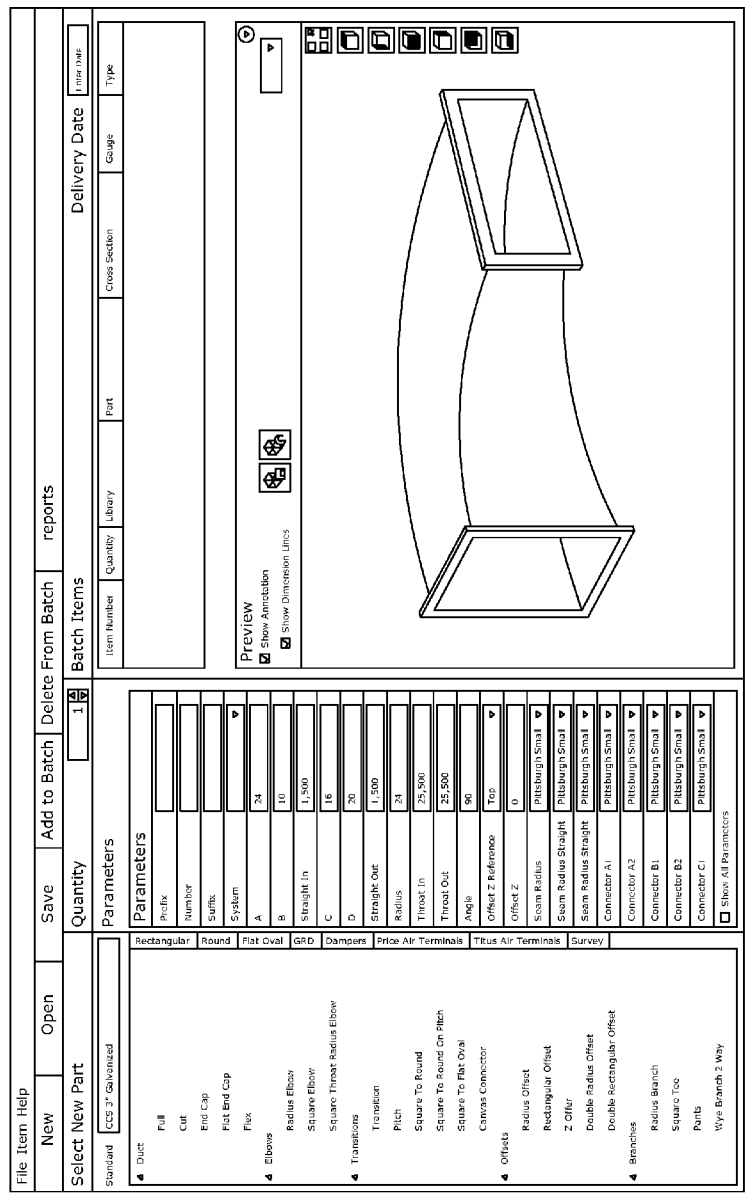
FIG. 4 is an exemplary interface illustrating the CAD program interface and illustrating the design of a part (a radius elbow) to be fabricated.
Figure 6:
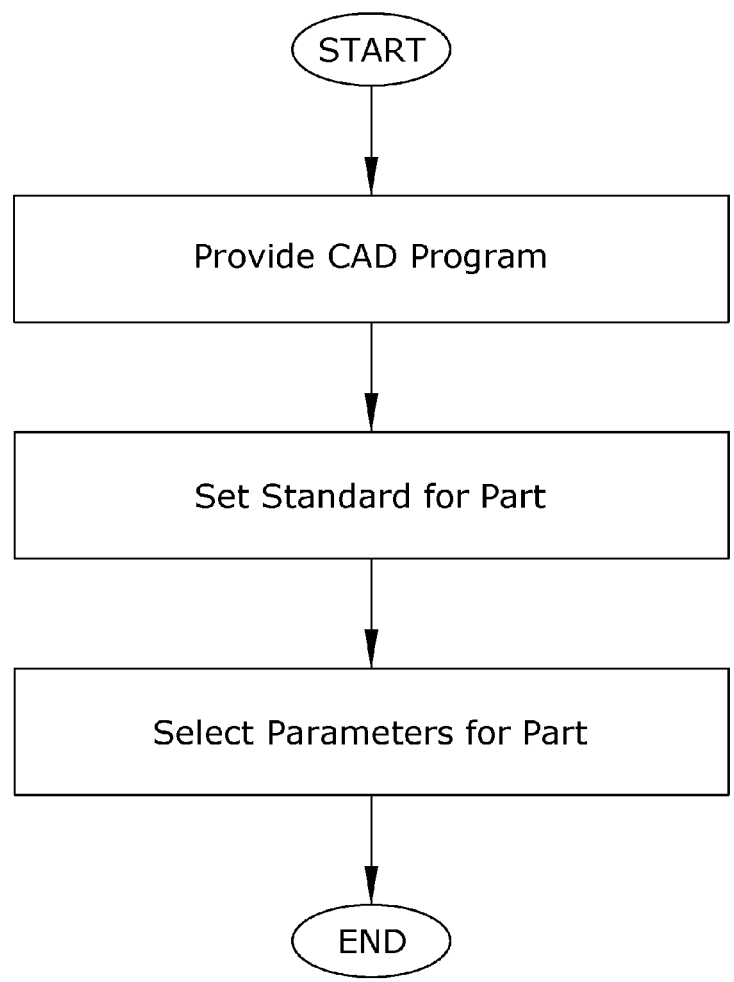
FIG. 6 is a flowchart illustrating the creation of the part to be fabricated in the CAD program.
Figure 7:
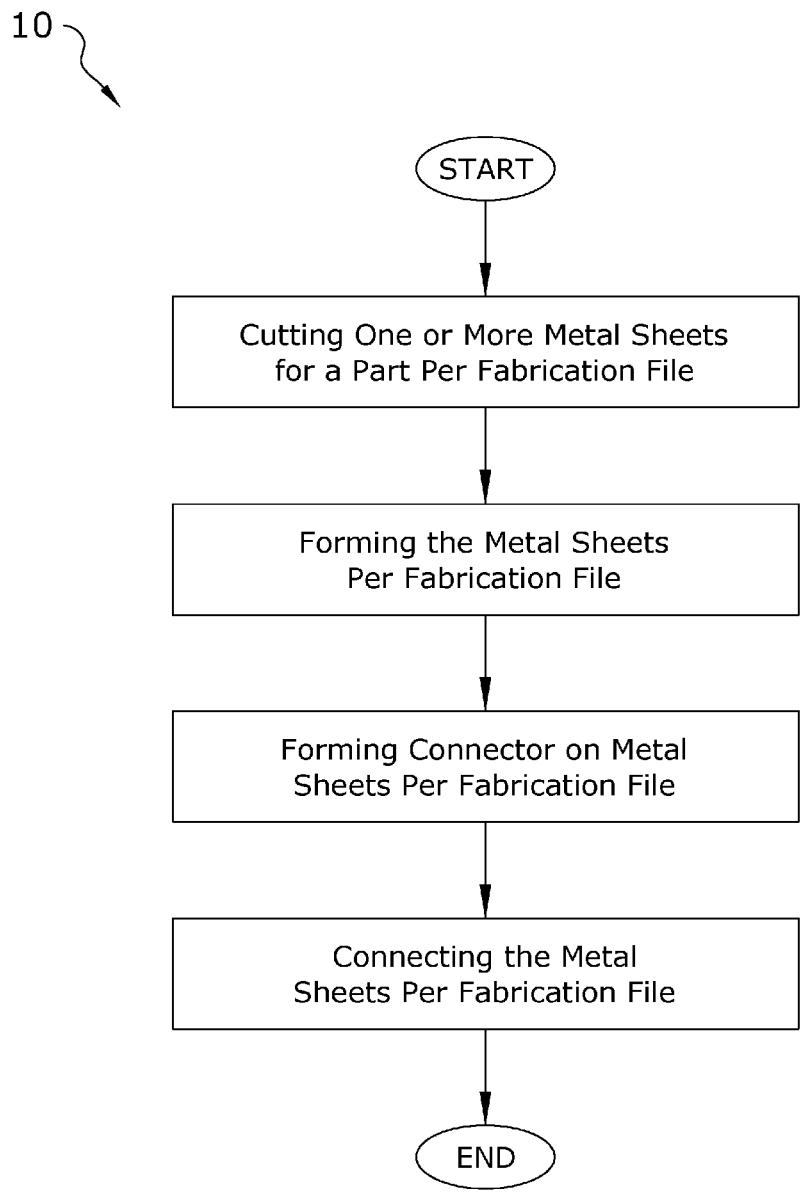
FIG. 7 is a flowchart illustrating the overall process for fabricating a part by the robotic devices per the information from the fabrication file.

A CAD operator creates one or a plurality of parts in a CAD program as illustrated in FIGS. 4 and 6 of the drawings. The parts are preferably comprised of ductwork part for an HVAC system. The parts created in the CAD program are saved in a batch file or a part file which is simply an electronic file readable by a computer. The batch file may include both the CAD information and the fabrication information for each part. Alternatively, the batch file may only include the CAD information and the fabrication information is generated from the CAD information by exporting or by a separate software program.

Figure 5:
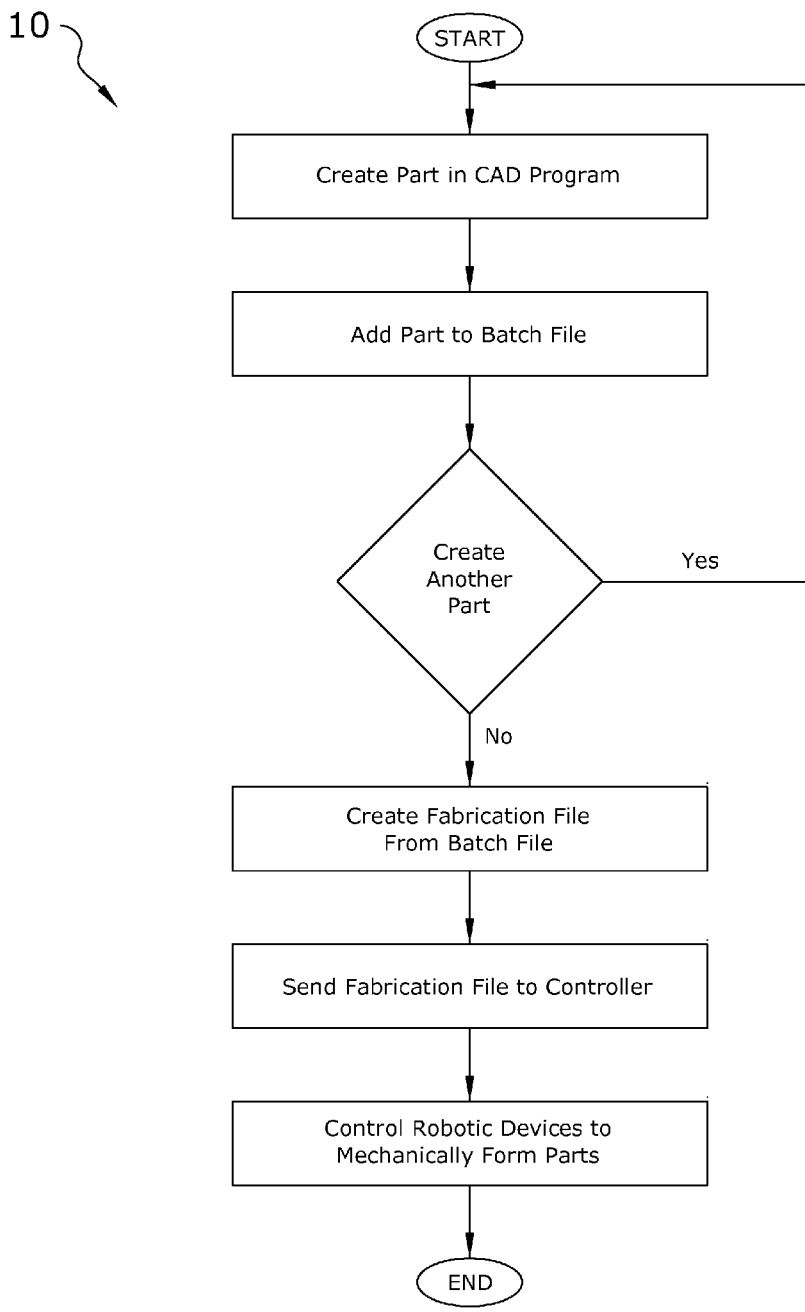
FIG. 5 is a flowchart illustrating the overall process for creating a fabrication file utilized by the controller to control the robotic devices.

The fabrication file is created for the plurality of parts from the batch file as illustrated in FIG. 5. The fabrication file is comprised of instructions to control the plurality of robotic devices 30a, 30b, 30c, 30d, 30e, 30f, 30g, 30h. The instructions in the fabrication file preferably include at least cutting instructions for the cutting robotic device 30h to cut the section of sheet metal into a plurality of sheet metal pieces and connection instructions for the connecting robotic device 30e to connect the plurality of sheet metal pieces together to form the plurality of parts. The fabrication file also preferably includes seam forming instructions for the seam forming robotic device 30a to form seams, end connector forming instructions for the end connector forming robotic device 30b, bend forming instructions for the bend forming robotic device 30c, lining instructions for the lining robotic device 30d, end connector instructions for the end connector finishing robotic device 30f and shipping instructions for the shipping robotic device 30g. The fabrication files is sent electronically to the controller, wherein the controller controls the plurality of robotic devices per the fabrication file.

A section of sheet metal is fed into one of the plurality of robotic devices. The section of sheet metal is fabricated according to the fabrication file by the robotic devices 30a, 30b, 30c, 30d, 30e, 30f, 30g, 30h to form one or more finished sheet metal products preferably comprised of ductwork parts for an HVAC system (e.g. radius elbow, square elbow, duct, etc.

FIG. 4 illustrates an exemplary radius elbow that utilizes four metal sheets (bottom, top, inside wall and outer wall) being designed within a CAD program. The user of the CAD program first selects what part they would like to have fabricated (e.g. a radius elbow for an HVAC system, etc.). As illustrated in FIG. 6 of the drawings, the user first sets the standard for the part to be formed and then selects the parameters (e.g. inside radius, outside radius, length, width, height, angle, seam radius, connector, etc.). The CAD parameters are utilized to create the fabrication parameters utilized by each of the robotic devices 30a, 30b, 30c, 30d, 30e, 30f, 30g, 30h to form the final product. For example, the fabrication parameters preferably includes cutting instructions for the cutting robotic device 30h to instruct the cutting robotic device 30h on how to cut the sheet metal positioned within the cutting robotic device 30h. Furthermore, the fabrication parameters include forming instructions for the bend forming robotic device 30c on how to bend each of the cut pieces of sheet metal after the same have been cut by the cutting robotic device 30h. In addition, the fabrication parameters in the fabrication file preferably include connector forming instructions for the end connector forming robotic device 30b on how to form connectors within each of the cut and formed pieces of sheet metal to provide for final assembly of the part. The fabrication instructions further include assembly information for the connecting robotic device 30e to provide instructions to the connecting robotic device 30e on how to assemble the various cut and formed pieces of sheet metal into the final product.

After the part is created in the CAD program, the user then selects the "Add to Batch" button within the CAD program as shown in FIG. 4, and the part is added to a batch file. The batch file is an electronic computer readable file that preferably stores the CAD information (for the visual representation of the part) and the fabrication information (electronic instructions for the robotic devices to form the visual representation of the part from sheet metal) for the part being designed.

The fabrication information is preferably created and stored within the batch file based upon the parameters selected for the part. The fabrication file is preferably created by exporting the fabrication information for the parts from the batch file. Alternatively, the fabrication file may be created by having the CAD program or another program convert the CAD parameters to the fabrication information required to instruct the robotic devices on how to manufacture the part from the CAD program.

For example, FIG. 4 illustrates an exemplary radius elbow designed within the interface of the CAD program having a bottom portion, a top portion, an inside wall and an outer wall thereby requiring four separate pieces of sheet metal to be cut, formed and assembled to form finished product (i.e. the radius elbow). The sheet metal is first fed into the cutting robotic device 30h which cuts out the separate pieces of sheet metal per a nested design as instructed by the fabrication file. The separate pieces of sheet metal are then transported to the bend forming robotic device 30c which forms the required bends (e.g. a curvature having a specific radius) in each of the separate pieces of sheet metal. It can be appreciated that some of the separate pieces of sheet metal do not require additional forming after being cut (e.g. the bottom portion of the radius elbow shown in FIG. 4) and may proceed to the end connector forming robotic device 30b and then to the connecting robotic device 30e for final assembly of the part (e.g. radius elbow). After the final product is formed (e.g. a radius elbow for an HVAC system of a building), the final product may be shipped via the shipping robotic device 30g. Various other robotic devices may be utilized to perform various additional functions to the sheet metal pieces and to the final product.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A method of fabricating sheet metal to form a part for an HVAC system using robotic devices, comprising:
    providing a plurality of robotic devices comprising a cutting robotic device, wherein said plurality of robotic devices are adapted to manipulate sheet metal;
    creating a part in a CAD program, wherein said part is comprised of ductwork for an HVAC system;
    saving said part in a part file;
    creating a fabrication file for said part, wherein said fabrication file is comprised of instructions to control said plurality of robotic devices, wherein said instructions include cutting instructions for said cutting robotic device to cut said section of sheet metal into a plurality of sheet metal pieces and connection instructions to connect said plurality of sheet metal pieces together;
    sending said fabrication file to a controller, wherein said controller controls said plurality of robotic devices per said fabrication file;
    feeding a section of sheet metal to one of said plurality of robotic devices;

fabricating said section of sheet metal according to said fabrication file; and forming a finished sheet metal product with said at least one robotic device, wherein said finished sheet metal product is comprised of a ductwork part for an HVAC system.

2. The method of claim 1, wherein said plurality of robotic devices are separate from each other.

3. The method of claim 1, wherein said plurality of robotic devices are integral with each other.

4. The method of claim 1, wherein said plurality of robotic devices are comprised of a cutting robotic device adapted to cut said section of sheet metal into a plurality of sheet metal pieces.

5. The method of claim 1, wherein said plurality of robotic devices are comprised of a connecting robotic device adapted to connect said plurality of sheet metal pieces together.

6. The method of claim 1, wherein said plurality of robotic devices are comprised of said cutting robotic device adapted to cut said section of sheet metal into a plurality of sheet metal pieces and a connecting robotic device adapted to connect said plurality of sheet metal pieces together.

7. The method of claim 1, wherein said plurality of robotic devices operate simultaneously.

8. The method of claim 1, wherein said controller directs a seam forming robotic device to form seams upon said section of sheet metal according to instructions on said fabrication file, and wherein said controller directs an end connector forming robotic device to form connectors in said section of sheet metal according to instructions on said fabrication file.

9. The method of claim 1, wherein said section of sheet metal is comprised of a sheet metal coil.

10. The method of claim 1, wherein said plurality of robotic devices are comprised of said cutting robotic device, a seam forming robotic device, an end connector forming robotic device, a bend forming robotic device, a lining robotic device, a connecting robotic device, an end connector finishing robotic device and a shipping robotic device.

11. A method of fabricating sheet metal to form a plurality of parts for an HVAC system using robotic devices, comprising:

providing a plurality of robotic devices comprising a cutting robotic device, wherein said plurality of robotic devices are adapted to manipulate sheet metal;

creating a plurality of parts in a CAD program, wherein said plurality of parts are comprised of ductwork for an HVAC system;

saving said plurality of parts are saved in a batch file;

creating a fabrication file for said plurality of parts from said batch file, wherein said fabrication file is comprised of instructions to control said plurality of robotic devices, wherein said instructions include cutting instructions for said cutting robotic device to cut said section of sheet metal into a plurality of sheet metal pieces and connection instructions to connect said plurality of sheet metal pieces together to form said plurality of parts;

sending said fabrication file to a controller, wherein said controller controls said plurality of robotic devices per said fabrication file;

feeding a section of sheet metal to one of said plurality of robotic devices;

fabricating said section of sheet metal according to said fabrication file; and forming a plurality of finished sheet metal products with said at least one robotic device, wherein said plurality of finished sheet metal products are comprised of ductwork parts for an HVAC system.

12. The method of claim 11, wherein said plurality of robotic devices are separate from each other.

13. The method of claim 11, wherein said plurality of robotic devices are integral with each other.

14. The method of claim 11, wherein said plurality of robotic devices are comprised of a cutting robotic device adapted to cut said section of sheet metal into a plurality of sheet metal pieces.

15. The method of claim 11, wherein said plurality of robotic devices are comprised of a connecting robotic device adapted to connect said plurality of sheet metal pieces together.

16. The method of claim 11, wherein said plurality of robotic devices are comprised of said cutting robotic device adapted to cut said section of sheet metal into a plurality of sheet metal pieces and a connecting robotic device adapted to connect said plurality of sheet metal pieces together.

17. The method of claim 11, wherein said plurality of robotic devices operate simultaneously.

18. The method of claim 11, wherein said controller directs a seam forming robotic device to form seams upon said section of sheet metal according to instructions on said fabrication file, and wherein said controller directs an end connector forming robotic device to form connectors in said section of sheet metal according to instructions on said fabrication file.

19. The method of claim 11, wherein said section of sheet metal is comprised of a sheet metal coil.

20. A method of fabricating sheet metal to form a plurality of parts for an HVAC system using robotic devices, comprising:

providing a plurality of robotic devices, wherein said plurality of robotic devices are adapted to manipulate sheet metal, wherein said plurality of robotic devices are comprised of a cutting robotic device adapted to cut said section of sheet metal into a plurality of sheet metal pieces and a connecting robotic device adapted to connect said plurality of sheet metal pieces together;

creating a plurality of parts in a CAD program, wherein said plurality of parts are comprised of ductwork for an HVAC system;

saving said plurality of parts are saved in a batch file;

creating a fabrication file for said plurality of parts from said batch file, wherein said fabrication file is comprised of instructions to control said plurality of robotic devices, wherein said instructions include cutting instructions for said cutting robotic device to cut said section of sheet metal into a plurality of sheet metal pieces and connection instructions to connect said plurality of sheet metal pieces together to form said plurality of parts;

sending said fabrication file to a controller, wherein said controller controls said plurality of robotic devices per said fabrication file;

feeding a section of sheet metal to one of said plurality of robotic devices, wherein said section of sheet metal is comprised of a sheet metal coil;

fabricating said section of sheet metal according to said fabrication file; and forming a plurality of finished sheet metal products with said at least one robotic device, wherein said plurality of finished sheet metal products are comprised of ductwork parts for an HVAC system.

* * * * *